(12) United States Patent
Chu et al.

(10) Patent No.: US 10,872,436 B2
(45) Date of Patent: Dec. 22, 2020

(54) SPATIAL POSITIONING METHOD, SPATIAL POSITIONING DEVICE, SPATIAL POSITIONING SYSTEM AND COMPUTER READABLE STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Minglei Chu, Beijing (CN); Hao Zhang, Beijing (CN); Lili Chen, Beijing (CN); Guixin Yan, Beijing (CN); Bin Zhao, Beijing (CN); Ziqiang Guo, Beijing (CN); Jian Sun, Beijing (CN); Wenhong Tian, Beijing (CN); Xinjian Liu, Beijing (CN); Zhanshan Ma, Beijing (CN); Jiankang Sun, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 122 days.

(21) Appl. No.: 16/177,356

(22) Filed: Oct. 31, 2018

(65) Prior Publication Data
US 2019/0304130 A1    Oct. 3, 2019

(30) Foreign Application Priority Data

Mar. 30, 2018  (CN) .......................... 2018 1 0293275

(51) Int. Cl.
*G06T 7/73* (2017.01)

(52) U.S. Cl.
CPC ...... *G06T 7/74* (2017.01); *G06T 2207/20021* (2013.01); *G06T 2207/30196* (2013.01); *G06T 2207/30204* (2013.01)

(58) Field of Classification Search
CPC ............ G06T 7/74; G06T 2207/30204; G06T 2207/30196; G06T 2207/20021
See application file for complete search history.

(56) References Cited

U.S. PATENT DOCUMENTS

| 2003/0151720 A1 | 8/2003 | Chernyak et al. |
| 2016/0203607 A1 | 7/2016 | Muller et al. |

FOREIGN PATENT DOCUMENTS

| CN | 1630487 A | 6/2005 |
| CN | 105631901 A | 6/2016 |

(Continued)

OTHER PUBLICATIONS

Linear N-Point Camera Pose Determination (Year: 1999).*

(Continued)

*Primary Examiner* — Nizar N Sivji
(74) *Attorney, Agent, or Firm* — Kinney & Lange, P.A.

(57) ABSTRACT

A spatial positioning method, a spatial positioning device, a spatial positioning system, and a computer readable storage medium are disclosed. The spatial positioning method includes: acquiring a two-dimensional image of an object to be positioned having a plurality of marking points, the two-dimensional image comprising a plurality of marking point images in one-to-one correspondence with the plurality of marking points; determining a correspondence between the plurality of marking points and the plurality of marking point images according to a relative positional relationship among the plurality of marking points and a relative positional relationship among the plurality of marking point images; and determining at least one spatial degree of freedom of the object to be positioned according to the (Continued)

relative positional relationship among the plurality of marking points, the relative positional relationship among the plurality of marking point images, and the correspondence between the plurality of marking points and the plurality of marking point images.

13 Claims, 4 Drawing Sheets

(56) References Cited

FOREIGN PATENT DOCUMENTS

| CN | 106681510 A | * | 5/2017 | |
|---|---|---|---|---|
| CN | 106681510 A | | 5/2017 | |
| WO | WO-2017143745 A1 | * | 8/2017 | ............... G06T 7/20 |

OTHER PUBLICATIONS

Robust and Fast Modelling of 3D Natural Object from Multiple Views (Year: 1999).*

First Chinese Office Action dated Dec. 9, 2019, received for corresponding Chinese Application No. 201810293275.7, 25 pages.

* cited by examiner

SPATIAL POSITIONING METHOD, SPATIAL POSITIONING DEVICE, SPATIAL POSITIONING SYSTEM AND COMPUTER READABLE STORAGE MEDIUM

CROSS-REFERENCE TO RELATED APPLICATION(S)

This application claims priority to the Chinese Patent Application No. 201810293275.7, filed on Mar. 30, 2018, which is incorporated herein by reference in its entirety.

TECHNICAL FIELD

The present disclosure relates to the field of Virtual Reality (VR)/Augmented Reality (AR) technology, and more particularly, to a spatial positioning method, a spatial positioning device, a spatial positioning system, and a corresponding computer readable storage medium.

BACKGROUND

With the development of VR/AR, the spatial positioning tracking technology, as one of main constituent technologies of the VR/AR, is becoming more and more important. There are many representative spatial positioning tracking methods on the market. However, these spatial positioning technologies have various problems to different degrees.

SUMMARY

According to a first aspect of the present disclosure, there is provided a spatial positioning method. The spatial positioning method comprises steps of: acquiring a two-dimensional image of an object to be positioned having a plurality of marking points, the two-dimensional image comprising a plurality of marking point images in one-to-one correspondence with the plurality of marking points; determining a correspondence between the plurality of marking points and the plurality of marking point images according to a relative positional relationship among the plurality of marking points and a relative positional relationship among the plurality of marking point images; and determining at least one spatial degree of freedom of the object to be positioned according to the relative positional relationship among the plurality of marking points, the relative positional relationship among the plurality of marking point images, and the correspondence between the plurality of marking points and the plurality of marking point images.

In some embodiments, the step of determining a correspondence between the plurality of marking points and the plurality of marking point images according to a relative positional relationship among the plurality of marking points and a relative positional relationship among the plurality of marking point images comprises: determining a first marking point image of the plurality of marking point images which corresponds to a first marking point according to marking features of the plurality of marking point images, wherein the first marking point has a specific marking feature; and determining a correspondence between marking points other than the first marking point and remaining marking point images in the two-dimensional image based on the relative positional relationship among the plurality of marking points, the relative positional relationship among the plurality of marking point images, and the determined first marking point image.

In some embodiments, the step of determining a first marking point image of the plurality of marking point images which corresponds to a first marking point according to marking features of the plurality of marking point images comprises: determining one of the plurality of marking point images which has a marking feature matching the specific marking feature as the first marking point image.

In some embodiments, the specific marking feature is associated with at least one of an area, a shape, a texture, or a color.

In some embodiments, the specific marking feature is an elliptical shape. The step of determining a correspondence between marking points other than the first marking point and remaining marking point images in the two-dimensional image based on the relative positional relationship among the plurality of marking points, the relative positional relationship among the plurality of marking point images, and the determined first marking point image comprises: identifying a characteristic axis of the elliptical shape of the first marking point image, wherein the characteristic axis is a major axis or minor axis of the elliptical shape; determining respective vertical distances from the plurality of marking point images to the characteristic axis of the elliptical shape; dividing the plurality of marking point images into groups of marking point images according to the determined vertical distances; and determining a correspondence between different marking point images in each group of marking point images and corresponding marking points.

In some embodiments, the step of dividing the plurality of marking point images into groups of marking point images comprises: dividing marking point images having the same vertical distance and located on the same side of the characteristic axis of the elliptical shape into one group of marking point images.

In some embodiments, the step of determining one of the plurality of marking point images which has a marking feature matching the specific marking feature as the first marking point image comprises: performing binarization processing on the two-dimensional image; determining one or more connected regions in the binarized two-dimensional image; and determining a connected region which satisfies at least one of the following conditions as the first marking point image: the connected region has a largest area or the connected region has an elliptical shape.

In some embodiments, the method further comprises: performing elliptical fitting on the one or more connected regions to determine a central point of each of the connected regions as a position of a corresponding marking point image.

In some embodiments, the plurality of marking points are at least four marking points.

In some embodiments, the plurality of marking points are eleven marking points.

In some embodiments, four groups of marking points are mirror symmetrically distributed with a characteristic axis of the largest elliptical first marking point as a symmetry axis, wherein numbers of marking points in various groups of marking points are 3, 2, 2 and 3, respectively, and a direction in which marking points in each group are arranged is parallel to the characteristic axis.

In some embodiments, each of the marking points is determined by using at least one of a visible light source, an infrared light source, or a non-light source marking point.

According to a second aspect of the present disclosure, there is provided a spatial positioning device. The spatial positioning device comprises: a processor; and a memory having instructions stored thereon, which when executed by the processor, cause the processor to perform the method according to the first aspect of the present disclosure.

According to a third aspect of the present disclosure, there is provided a spatial positioning system. The spatial positioning system comprises: the spatial positioning device according to the second aspect of the present disclosure; and a camera configured to capture a two-dimensional image of an object to be positioned and transmit the two-dimensional image to the spatial positioning device.

According to a fourth aspect of the present disclosure, there is provided a computer readable storage medium. The computer readable storage medium has instructions stored thereon, which when executed by a processor, cause the processor to perform the method according to the first aspect of the present disclosure.

BRIEF DESCRIPTION OF THE DRAWINGS

The above and other purposes, features and advantages of the present disclosure will become more apparent from preferred embodiments of the present disclosure taken below in conjunction with accompanying drawings, in which.

DETAILED DESCRIPTION

In order to make the purposes, technical solutions and advantages of the present application more clear and apparent, the present application will be further described in detail below in conjunction with the accompanying drawings. It should be noted that the description below is illustrated merely by way of example instead of limiting the present disclosure. In the following description, numerous specific details are set forth to provide a more thorough understanding of the present disclosure. However, it will be obvious to those skilled in the art that the present disclosure may be practiced without these specific details. In other instances, well-known circuits, materials or methods are not described in detail in order to avoid obscuring the present disclosure.

Reference throughout this specification to "an embodiment", "an embodiment", "one example" or "an example" means that a particular feature, structure, or characteristic described in connection with the embodiment or example is included in at least an embodiment of the present invention. Thus, the appearances of the phrase "in an embodiment", "in an embodiment", "one example" or "an example" in various places throughout this specification are not necessarily all referring to the same embodiment or example. Furthermore, the particular features, structures, or characteristics may be combined in any suitable combination and/or sub-combination in one or more embodiments or examples. In addition, it should be understand by those skilled in the art that the accompanying drawings provided herein are for the purpose of illustration, and are not necessarily drawn to scale. A term "and/or" used herein comprises any or all combinations of one or more listed related items.

As described above, in order to spatially position an object such as a VR helmet or a remote controller etc., it is generally required to provide a large number of visible/infrared light sources on the VR helmet, the remote controller etc. as marking points or reference points, and these light sources need to flicker in different modes to form features which may be distinguished from each other. In addition, in order to capture these features, it is often required to provide more than two visible/infrared cameras. This undoubtedly increases the hardware cost required for spatial positioning. In order to at least partially solve or alleviate the problem, according to some embodiments of the present disclosure, there is provided a single camera-based spatial position tracking solution in which brightness of marking points may not be changed. In this solution, positions and numbers of the marking points may be determined by judging sizes and/or shapes of the marking points and/or a relative positional relationship among the marking points, thereby achieving a simple and quick method and realizing cost saving.

Hereinafter, an application scenario of a spatial positioning system according to an embodiment of the present disclosure will be described in detail in conjunction with FIG. 1.

Figure 1:
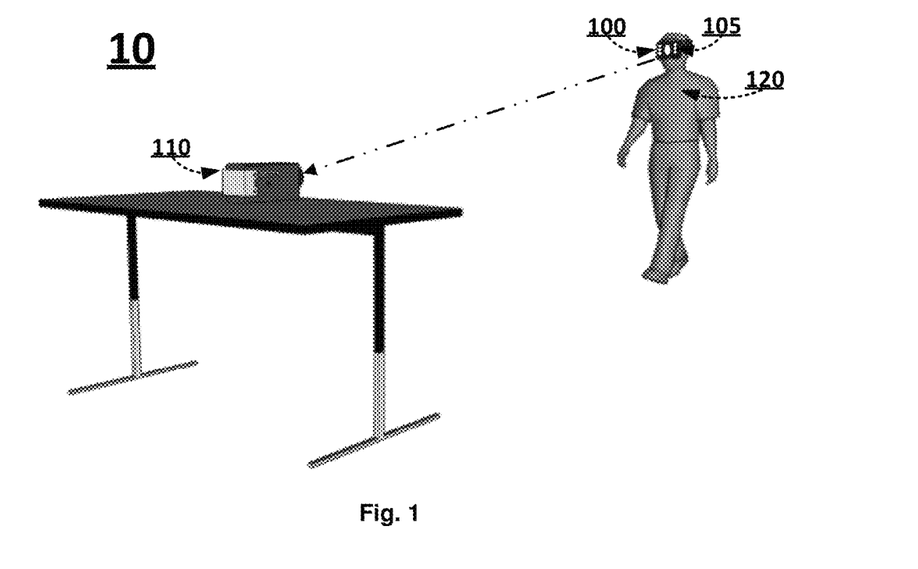
FIG. 1 is an exemplary application scenario illustrating a spatial positioning system according to an embodiment of the present disclosure.

FIG. 1 is an exemplary application scenario illustrating a spatial positioning system 10 according to an embodiment of the present disclosure. As shown in FIG. 1, the spatial positioning system 10 may comprise a camera 110 and an object 100 to be positioned. Further, one or more marking point patterns 105 for positioning may be provided on the object 100 to be positioned.

It should be noted that in the present embodiment, the object 100 to be positioned may be a VR helmet 100 worn by a user 120. However, the present disclosure is not limited thereto. In fact, the present disclosure is equally applicable to any other application scenario in which spatial positioning is required, such as video surveillance systems, automated driving systems, etc. Further, although only the VR helmet 100 worn by the user 120 is shown as the object to be positioned in the embodiment shown in FIG. 1, the present disclosure is not limited thereto. For example, it is also possible to spatially position a controller held by the user 120, an apparel worn on a body of the user 120, etc., and even to position a non-human user 120 (for example, a robot or other automated movable machines.) In other words, as long as the object 100 to be positioned has marking points as described below, the spatial positioning solution according to the embodiment of the present disclosure is applicable thereto.

Further, the term "spatial positioning" as used herein refers to determining at least one spatial degree of freedom of an object to be positioned (for example, the object 100), i.e., at least one degree of freedom of a spatial position (having three degrees of freedom, i.e., three-dimensional coordinates in space) and a posture (having three degrees of freedom, i.e., pitch, roll, and yaw.) In a flight coordinate system of, for example, an aircraft, the pitch degree of freedom refers to a degree of freedom of rotation with a left-right direction (for example, from a left wing to a right wing or vice versa) of the aircraft as an axis, and the roll degree of freedom refers to a degree of freedom of rotation with an anterior-posterior direction (for example, a direction from a tail of the aircraft to a head of the aircraft or vice versa) of the aircraft as an axis, and the yaw degree of freedom refers to a degree of freedom of rotation with a direction (for example, a direction from a belly of the aircraft to a top of the aircraft or vice versa) perpendicular to the two directions described above as an axis. Similarly, the three degrees of freedom of the posture may also be applied to any object to be positioned, including, but not limited to: the object 100 to be positioned or the VR helmet 100 described above. Herein, the term "one or more degrees of freedom" may be used interchangeably with the term "position and/or posture", unless specifically stated otherwise.

Returning back to FIG. 1, the one or more marking points 105 may be, for example, infrared light sources, visible light sources, or even common marking points (for example, marking point patterns which are printed or pasted, etc.) In the embodiment shown in FIG. 1, the marking points 105 may be light sources with constant brightness or patterns which may reflect visible/infrared light. Thus, the marking points 105 may be realized, for example, by only infrared light sources and light transmission patterns (for example, baffles having specific light transmission patterns), or by printing or pasting patterns on the object to be positioned, which significantly reduces the production cost. In addition, the one or more marking points 105 may have the same or different marking features. Herein, the term "marking feature" may refer to, for example, an optically visible feature of a marking point, including, but not limited to: a size, a shape, a texture, and/or a color, etc.

In addition, in view of the fact that the marking points 105 may not be captured by the camera 110 in a case where the user 120 turns his/her back to the camera 110, a plurality of groups of marking points 105 may be placed on the VR helmet 100 (for example, front, back, and/or side thereof) to further enhance the effect of spatial positioning. As will be described in greater detail below, the plurality of groups of marking points 105 may be distinguished from each other by using marking points having different marking features to enable identification of the plurality of groups of marking points 105. For example, one group of marking points 105 provided on the front side of the VR helmet 100 may adopt an arrangement shown in FIG. 2, one group of marking points 105 provided on the left side of the VR helmet 100 may adopt an arrangement of triangles with various sizes, one group of marking points 105 provided on the right side of the VR helmet 100 may adopt an arrangement of rectangles with various sizes, and one group of marking points 105 provided on the back side of the VR helmet 100 may adopt an arrangement of stars with various sizes. In addition, marking features of various marking points in each group of marking points 105 may also adopt different arrangements. However, the present disclosure is not limited thereto. In fact, it only needs to distinguish various groups of marking points 105 from each other, and determine respective first marking points in various groups of marking points 105. It should be noted that, the first marking point herein refers to a marking point of which a correspondence needs to be firstly determined when a correspondence between various marking points and marking point images is determined as described below, so that it makes possible or faster to determine other marking points by determining the first marking point. For example, the first marking point may be an elliptical shape having the largest area, and the other marking points may be smaller triangles etc. In fact, any suitable marking feature may be used as long as the first marking point may be distinguished from other marking points.

Herein, the term "relative positional relationship" refers to, for two points, a distance between the two points; and for more than three (including three) points, a distance between any two of the more than three points and an angle between any two straight lines among all straight lines for connecting any two points. In the embodiment shown in FIG. 1, in a real world coordinate system, for example, a relative positional relationship among these marking points 105 may be considered to be fixed. However, it should be noted that, for example, in a camera coordinate system, since various marking points 105 are imaged on a phase plane, a relative positional relationship among marking point images corresponding to various marking points 105 varies depending on a position and/or posture (or spatial degrees of freedom) of the object 100 to be positioned.

Returning back to FIG. 1, the camera 110 may capture a two-dimensional image including the VR helmet 100 as the user 120 wears the VR helmet 100 and is in motion (for example, translation and/or rotation.) Then, the two-dimensional image may be transmitted to the VR helmet 100 or another device for image processing. As will be described in more detail below, the VR helmet 100 or the other device may identify corresponding marking point images of the plurality of marking points 105 in the image and determine positions of these marking points in the image. Then, a position and/or posture of the object 100 to be positioned relative to the camera 110 may be determined based on the positions in the image and preset relative spatial positions of the marking points (or more generally, a spatial model of the marking points) according to an algorithm for determining a spatial degree of freedom, as shown, for example, in FIG. 4 described below.

It should be noted that although the camera 110 is illustrated as being placed on a surface of a table in FIG. 1, the present disclosure is not limited thereto. In fact, the camera 110 may be placed in any desired position, such as on a wall, in a vehicle, or in a hand etc. Further, although in the solution described above, the image captured by the camera 110 is processed by the VR device 100, the present disclosure is not limited thereto. In fact, the image may also be processed by the camera 110 itself or by another external electronic device (for example, a computer, an intelligent phone, or any other suitable device in communication with the camera 110 and the VR helmet 100.) After a processing result is obtained, the electronic device may transmit a determination result to, for example, the VR helmet 105, and the VR helmet 105 performs a corresponding operation, for example, an operation of displaying a scene change corresponding to an action.

Further, although in some embodiments, spatial positioning processing may be performed for each frame of image, the present disclosure is in fact not limited thereto. For example, in some other embodiments, after the position and/or posture of the object (target) to be positioned is determined using the spatial positioning solution described herein in a first frame, other target tracking algorithms with less computational complexity/more simplicity, including, but not limited to: a CAM SHIFT algorithm, a MEAN SHIFT algorithm, etc., may be used for various subsequent frames of images. In other words, in this case, as long as the target tracking algorithm may be used to continuously track the position and/or posture of the target, it is not necessary to adopt the above spatial positioning method for subsequent operations. Of course, it is also possible to periodically or aperiodically re-determine the position and/or posture of the target using the above spatial positioning method.

Next, the marking points according to the embodiment of the present disclosure will be described in detail in conjunction with FIG. 2.

Figure 2:
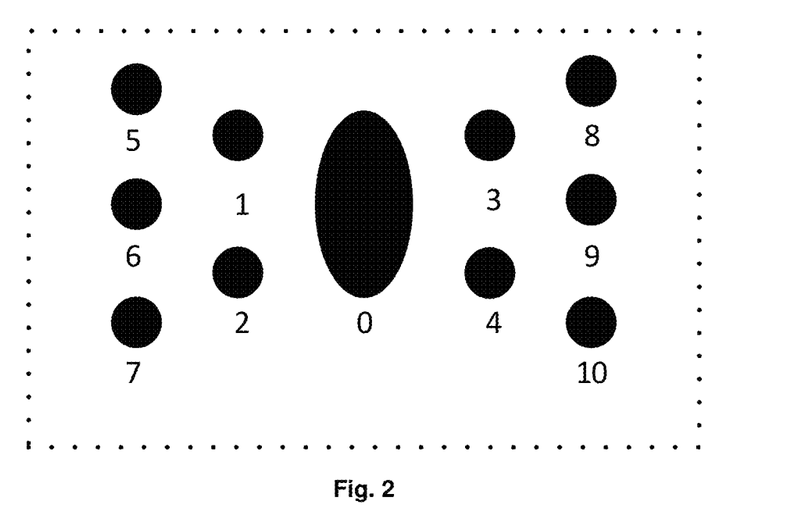
FIG. 2 is an exemplary arrangement diagram illustrating marking points according to an embodiment of the present disclosure.

FIG. 2 is an exemplary arrangement diagram illustrating the marking points 105 according to the embodiment of the present disclosure. As shown in FIG. 2, the arrangement of the marking points may comprise, for example, eleven marking points. However, the present disclosure is not limited thereto. In fact, as will be described below in connection with FIG. 4, only at least four marking points are required for a corresponding positioning operation. For example, in some embodiments, four marking points may be arranged in various manners, for example, the four marking points may be arranged in an 2×2 array, arranged in a straight line, arranged on a circumference of a circle, etc. In fact, it only needs to enable the four marking points to be observed by the camera 110 and enable correct determination of corresponding marking point images of the four marking points in an image. As described below in connection with FIG. 4, it only needs to provide the at least four marking points, to enable determination of a position and/or posture of an object to be positioned (for example, the object 100 to be positioned) associated with the four marking points. However, considering that in a case of some gestures of the user 120, not all the marking points 105 may be observed by the camera 110, and there may further be conditions of image noises, data errors caused by ambient light with excessive intensity, etc., more than four marking points may be provided for subsequent positioning operations to improve the robustness of the system.

Further, in the embodiment shown in FIG. 2, it may be seen that a marking point 0 (hereinafter, sometimes referred to as "first marking point") has a size and shape (or more generally, marking features) different from those of other marking points. As shown in FIG. 2, the marking point 0 may have an elliptical shape larger than shapes of the other marking points, and the other marking points are all smaller circles. As will be described below in conjunction with FIGS. 3A-3C, the first marking point 0 may be firstly determined from the image, and then a correspondence between the other marking points and corresponding marking point images thereof may be determined according to the first marking point 0, so as to determine positions of various marking points and corresponding numbers thereof (or more generally, identifiers.) For example, in the embodiment shown in FIG. 2, one or more groups of marking points, for example, two or four groups of marking points etc., may be mirror symmetrically distributed with a characteristic axis (a major axis or minor axis, wherein the major axis is taken as an example in FIG. 2) of the largest elliptical first marking point 0 as a symmetry axis. Data redundancy is provided by symmetrically providing the plurality of groups of marking points, so as to effectively improve the identification accuracy of the marking point images. For example, when marking points/groups of marking points on one side of the symmetry axis are determined, even if marking points/groups of marking points on the other side of the symmetry axis are not visible in the image due to ambient light with excessive intensity, line of sight occlusion, etc., the position and/or posture of the object to be positioned may also be determined as described below in FIG. 4. In addition, in some embodiments in which four groups of marking points are used, numbers of marking points in various groups of marking points may be (but not limited to) 3, 2, 2 and 3, respectively, and a direction in which marking points in each group are arranged may be parallel to the major axis. The direction in which the marking points are arranged is set to be parallel to, for example, the major axis of the elliptical shape of the first marking point 0, so that an order in which marking points in the same group of marking points are arranged may be easily determined. For example, in a group consisting of marking points 1 and 2, it may be easily determined that a direction from the marking point 2 to the marking point 1 is the direction of the major axis of the elliptical shape, and thereby the marking point 1 and the marking point 2 are determined respectively. However, the present disclosure is not limited to such a specific arrangement. Further, the arrangement may be determined correspondingly according to a specific shape, size etc. of the object to be positioned, and is not limited to a fixed arrangement.

It should be noted that the shape of the first marking point 0 is not limited to an elliptical shape, but may be any shape for which a specific orientation thereof may be identified, including, but not limited to: a triangular shape, a rectangular shape, a star shape, etc. For example, as described below in connection with FIG. 3B, numbers of various other marking points may further be determined according to the major axis and/or minor axis of the determined (or identified) elliptical shape. However, in a case of using an isosceles triangle, a direction orientated by, for example, an angle between two longer sides thereof may be determined to be similar to a direction of a major axis of an elliptical shape, and a direction perpendicular to this direction may be determined to be similar to a direction of a minor axis of the elliptical shape. Then, the operation of determining a number of a marking point may be performed in the same way. In addition, sizes of various marking points may also be different or the same, for example, the first marking point 0 is the largest, a tenth marking point is the smallest, etc. In some embodiments, data redundancy may further be provided by providing marking points with different sizes to more effectively improve the identification accuracy of the marking point images. For example, when a marking point image in the image corresponding to a marking point which should been large is smaller than or equal to a marking point image in the image corresponding to a marking point which should been small, it may substantially be determined that the larger marking point should be farther away from the camera 110 or has a smaller horizontal angle (for example, in a case where the marking points are not coplanar); however if it is determined in the following way that a posture of the object 100 to be positioned does not conform to this conclusion (for example, the larger marking point is closer to the camera 110 or has a larger horizontal angle), it may be determined that problems such as calculation errors/image errors etc. have occurred, and therefore the judgment result may be discarded and a new round of spatial positioning may be re-executed.

In addition, once the marking points are arranged, relative spatial positions of the marking points may be recorded. For example, a center of the elliptical shape of the first marking point 0 may be recorded as an origin position, and then coordinates of circular centers of other various marking points 1-10 may be recorded, thereby forming a spatial model of the marking points.

In addition, as described above, the marking points 0-10 may be printed patterns printed on the VR helmet 100, or marking points formed by using only infrared light sources/visible light sources and light transmission patterns, without using a plurality of light sources which are required to flicker at different frequencies as in other solutions as described above. Thus, the VR helmet 100 having a plurality of marking points 105 (or other device having the marking points 105) may be manufactured at a lower cost.

In addition, it should be noted that it needs to select a corresponding camera 110 according to the arranged marking points 105 to photograph the marking points 105. For example, in a case where the marking points 105 are infrared light sources, the camera 110 may be an infrared camera 110 for a corresponding wavelength. If the marking points 105 are visible light sources or common printed marking points, a visible camera 110 may be used.

In addition, brightness and/or relative positions of the marking points 105 may further be adjusted to meet the requirements of position tracking. For example, assuming that the marking points 105 are at specified distances from the camera 110, the camera 110 should be able to identify the first marking point and other marking points from the plurality of marking points 105. For this reason, it needs to appropriately adjust sizes of the marking points and/or intervals between the marking points etc. In addition, in order to avoid the influence of image noises on subsequent processing, the marking points 105 may also be required to have specific brightness to avoid excessive image noises due to excessive light sensitivity of the camera 110. Thus, this may be determined according to various parameters of the camera 110 (including, but not limited to: a focal length, light sensitivity, shutter, etc.) and/or design requirements of the spatial positioning system 10.

Next, image processing performed on a plurality of marking points 105 collected by the camera 110 according to an embodiment of the present disclosure will be described in detail in conjunction with FIGS. 3A-3C.

Figure 3A:
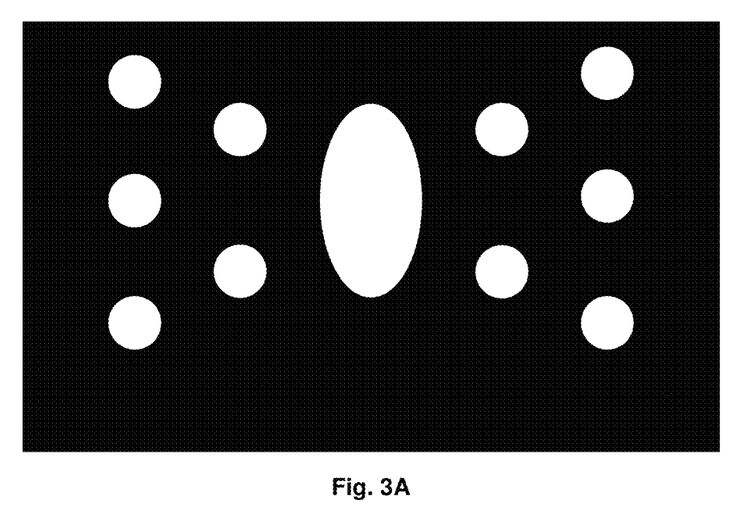
FIGS. 3A-3C are schematic diagrams illustrating various phases of spatial positioning processing of marking point images according to an embodiment of the present disclosure.
Figure 3B:
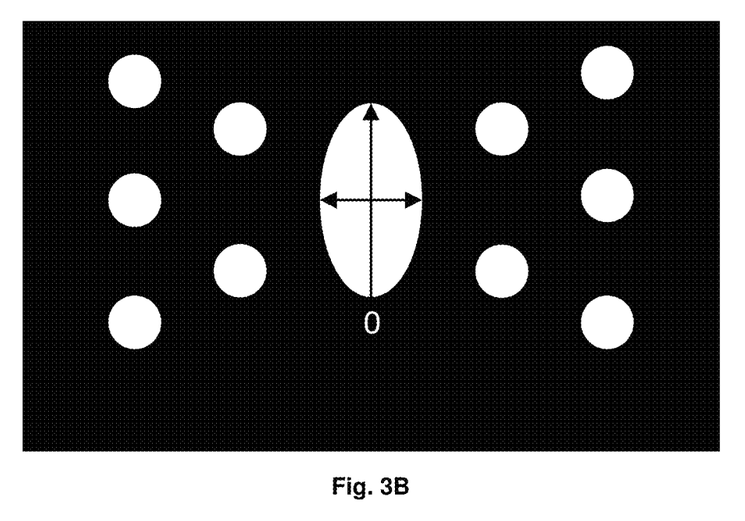
Figure 3C:
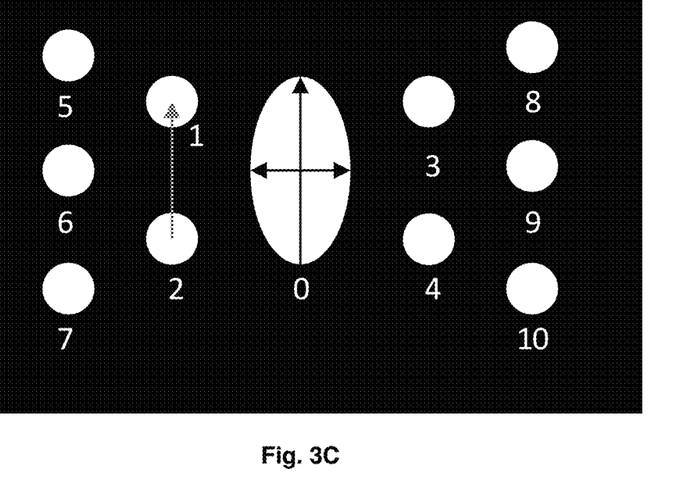

FIGS. 3A-3C are schematic diagrams illustrating various phases of spatial positioning processing of marking point images according to an embodiment of the present disclosure. FIG. 3A illustrates marking point images of a plurality of marking points 105 captured by the camera 110. It should be noted that an image captured by the camera 110 is not limited to the images of the marking points 105, and may comprise an image including the user 120 or other targets. Thus, in some embodiments, it may be desirable to pre-process the image captured by camera 110 before the image as shown in FIG. 3A is formed. For example, in one embodiment, the image may be preliminary identified to determine an approximate region of the marking points 105 and crop the image, so that a device (for example, the VR helmet 100 or the camera 110 shown in FIG. 1 or another electronic device) which performs the image processing shown in FIGS. 3A-3C may focus on the processing of the marking point images. In addition, the image may further be filtered to remove possible noises generated by an image sensor of the camera 110. Further, in one embodiment, the camera 110 may further be calibrated before the camera 110 captures the image. For example, it may be determined whether the camera 110 operates normally, whether it needs to adjust parameters (for example, light sensitivity, shutter, aperture, etc.) of the camera etc. by photographing a preset image having a specified position and/or posture.

After the pre-processing steps described above are performed in the above embodiment, the pre-processed image may be binarized to form a binarized image (for example, a black-and-white image) as shown in FIG. 3A. For example, in some embodiments, the binarization process may be a threshold-based binarization process, that is, a process of setting pixels having grayscales below a threshold to be white, and setting pixels having grayscales above the threshold to be black, so as to form the black and white image. Further, in some other embodiments in which opposite grayscale values are used, the binarization process may also be a process of setting pixels having grayscales above a threshold to be white and setting pixels having grayscales below the threshold to be black. After the binarized image is formed, for example, white connected regions existing in the image may be determined. For example, the connected regions may be determined by progressively scanning pixels to determine whether the pixels are white pixels and setting an equivalence relationship between adjacent white pixels. Those skilled in the art will be aware of a variety of algorithms for determining connected regions, which are thus not described in detail here in the present disclosure.

After the plurality of connected regions are determined, a connected region having the largest area therein may be determined as a marking point image of the first marking point 0, as shown in FIG. 3B. However, it should be noted that a manner in which the marking point image of the first marking point 0 is determined is not limited thereto, and the marking point image of the first marking point 0 may be determined in any suitable manner. For example, ellipse fitting may be performed for each connected region, and therefore a connected region in which a major axis and a minor axis have different lengths (or a difference therebetween is greater than a certain threshold) is determined to be the marking point image of the first marking point 0. As another example, ellipse fitting may be performed while determining the largest area, so as to ensure the reliability of the first marking point 0.

As shown in FIG. 3B, after the marking point image of the first marking point 0 is determined, ellipse fitting may be performed for the first marking point 0 to determine a major axis and/or a central point of the first marking point 0. Further, it is also possible to determine the determined central point of the elliptical shape as both a position of the first marking point 0 and an origin of the plurality of marking points 105. Further, in a case where the major axis of the elliptical shape is determined, the image may be divided into two regions on right and left sides of the major axis as a boundary line. However, it should be noted that the present disclosure is not limited thereto. In fact, the image may also be divided according to the minor axis. Further, in a case where the first marking point 0 having another shape is used, the image may be divided by, for example, a height of a triangle or a line which passes through a central point of a rectangle and is parallel to a long side of the rectangle etc.

Next, distances between other marking points and the first marking point 0 may be calculated, and numbers (or identifiers) of various marking points may be determined according to a direction of the determined major axis (or other directions). For example, in some embodiments, for a left region of the image, two marking points closest to the first marking point 0 may be firstly determined, and if a direction of a vector composed of the two marking points is the same as the direction of the major axis of the elliptical shape, a marking point, as a start point of the vector, may be determined as a marking point numbered as 2, and a marking point, as an end point of the vector, may be determined as a marking point numbered as 1, as shown in FIG. 3C.

In addition, in some other embodiments, various marking points may be grouped according to vertical distances from various marking points to the major axis and regions where various marking points are located with respect to the major axis. For example, as shown in FIG. 3C, the marking points 1 and 2 may be divided into one group, marking points 5, 6 and 7 may be divided into one group etc. Then, correct numbers of various marking points in each group may be determined according to the direction of the major axis of the elliptical shape. It should be noted that in the embodiment shown in FIG. 1, since a manner in which the user 120 wears the VR helmet 100 is substantially fixed, it is less likely that the plurality of marking points 105 are upside down, and thus it is also convenient to determine the marking points 105. However, in a case where the marking points 105 may be upside down, a correct direction may also be determined by adjusting the marking points 105. For example, the marking point 1 may be replaced with a triangular marking point, so that only in a case where the triangular marking point 1 appears above the circular marking point 2, the determined direction is the correct direction corresponding to the direction of the major axis of the elliptical shape. Otherwise, the marking points should be rotated by 180 degrees. Therefore, the embodiment of the present disclosure is applicable to various scenarios.

After the corresponding numbers of various marking point images in the image are determined as shown in FIG. 3C, positions (for example, central pixel positions or relative pixel positions relative to the central point of the first marking point 0) of the marking points corresponding to the numbers may be recorded.

Next, a spatial posture of the object 100 to be positioned relative to the camera 110 may be calculated using, for example, an algorithm shown in FIG. 4 based on the positions (hereinafter sometimes referred to as coordinates in a camera coordinate system) of the plurality of marking point images in the image and spatial positions (hereinafter sometimes referred to as coordinates in a world coordinate system) of the plurality of corresponding marking points. The spatial posture may comprise a position matrix and a rotation matrix as described in detail below in conjunction with FIG. 4.

In addition, in some embodiments, shapes of the marking points 105 may even be identifiers of the marking points 105 themselves. For example, the shapes of the marking points 105 may be shapes formed by characters (for example, letters, numbers, and/or Chinese characters, etc.) which may be used to distinguish the respective marking points 105 from each other, in addition to being used as the shapes of the marking points 105. For example, a first marking point in the marking points 105 may have a shape of "1", a second marking point in the marking points 105 may have a shape of "2", and so on. In this case, a correspondence between various marking point images and corresponding marking points may be determined by directly identifying characters of various marking point images, and thereby the spatial posture etc. of the object 100 to be positioned may be determined.

Further, although the above solution of firstly determining the correspondence between the first marking point and a marking point image thereof, and then determining the correspondence between various other marking points and marking point images thereof, the present disclosure is not limited thereto. In fact, it is also possible to directly determine the correspondence between the marking points and the marking point images based on a relative positional relationship among the marking points and a relative positional relationship among the marking point images without determining a correspondence between a certain specific marking point and an image thereof.

Figure 4:
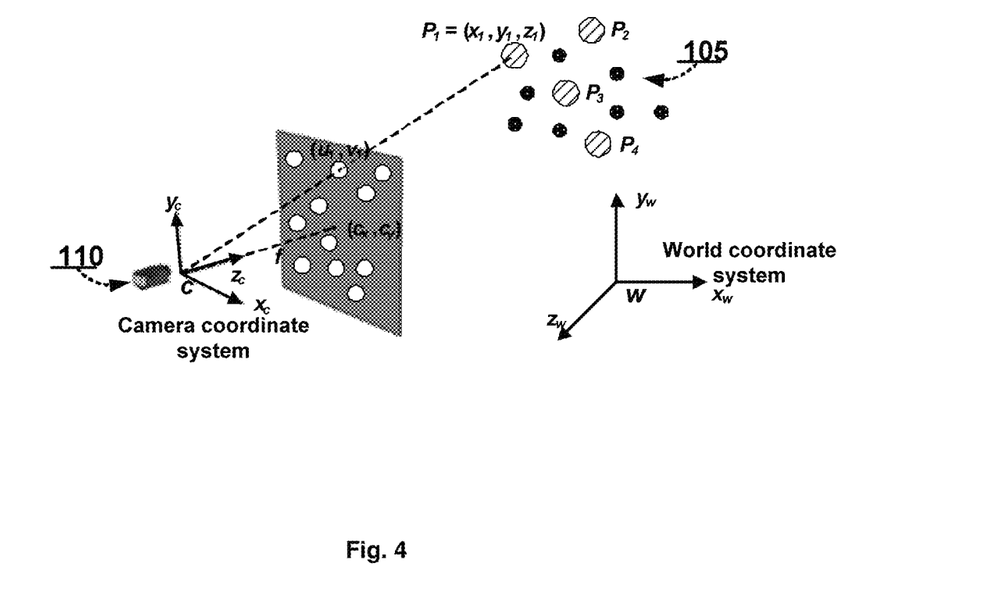
FIG. 4 is an exemplary diagram illustrating an algorithm for determining a spatial degree of freedom of an object according to an embodiment of the present disclosure.

FIG. 4 is an exemplary diagram illustrating an algorithm of determining a spatial degree of freedom according to an embodiment of the present disclosure. As shown in FIG. 4, the camera 110 may image a plurality of three-dimensional marking points 105 as previously described, to form a plurality of marking point images on an image plane thereof. For example, in the embodiment shown in FIG. 4, a first marking point having coordinates $p_1=[x_1\ y_1\ z_1]^T$ in a world coordinate system w may be imaged to obtain a corresponding marking point image thereof in an image plane having coordinates $[u_1\ v_1]^T$ in a camera coordinate system c. Similarly, other marking points may be imaged and coordinates of corresponding marking point images may be obtained.

It should be illustrated that the corresponding coordinates of the marking points 105 in the world coordinate system w may be determined according to a relative positional relationship among the marking points 105, and the corresponding coordinates of the marking point images in the camera coordinate system c may be determined according to a relative positional relationship among the marking point images. Specifically, for example, the coordinates of various marking point images in the camera coordinate system c may be determined according to the relative positional relationship among various marking point images by taking an arbitrary point (for example, a lower left pixel point, a lower right pixel point, or a central point of a first marking point image, etc.) in the collected image being an origin as an example. Similarly, the coordinates of various marking points in the world coordinate system w may be determined according to the relative positional relationship among various marking points by taking an arbitrary point of the object 100 to be positioned or at any other fixed position (for example, a center of the first marking point on the object 100 to be positioned or a center of the object to be positioned etc.) being an origin as an example. In a case where different origins and/or different axial directions are used, these coordinates may be mutually transformed by only spatial translation and/or rotation. In view of the relatively fixed position of the camera 105, determination of a rotation and/or translation matrix of the world coordinate system w relative to the camera coordinate system c in the following manner is equivalent to determination of the position and/or posture of the object 100 to be positioned.

Therefore, three-dimensional coordinates (x, y, z) of the marking points in the world coordinate system w (i.e., a real world coordinate system) are transformed into two-dimensional coordinates (u, v) in the camera coordinate system c by rotation and/or translation, and a transformation relationship expressed by the following formula is formed:

$$sp_c = K[R|T]p_w \quad (1)$$

or a more specific form is obtained:

$$s\begin{bmatrix} u \\ v \\ 1 \end{bmatrix} = \begin{bmatrix} f_x & \gamma & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} x \\ y \\ z \\ 1 \end{bmatrix} \quad (2)$$

where $p_w=[x\ y\ z]^T$ is coordinates of a point p in the world coordinate system, $p_c=[u\ v]^T$ is coordinates of a corresponding image of the point p in the camera coordinate system, K is an inherent camera parameter matrix (wherein $f_x$ and $f_y$ are zoomed focal lengths, respectively, y is a skew parameter which is sometimes assumed to be 0, and $(c_x, c_y)$ is coordinates of a main image point, as mentioned below), s is a scaling factor of the main image point, and R and T are a 3D rotation matrix and a 3D translation matrix to be calculated of the camera, respectively. As seen above, the inherent camera parameter matrix K itself is typically determinate in a case where the camera 110 is determinate, and thus may be considered as a constant for simplicity in the embodiments of the present disclosure. However, the present disclosure is not limited thereto, and in fact, it is also possible to perform calculation using a corresponding algorithm for an indeterminate camera parameter matrix K.

The rotation matrix $$R = \begin{bmatrix} r_{11} & r_{12} & r_{13} \\ r_{21} & r_{22} & r_{23} \\ r_{31} & r_{32} & r_{33} \end{bmatrix}$$

and the translation matrix $$T = \begin{bmatrix} t_1 \\ t_2 \\ t_3 \end{bmatrix}$$

may be determined using various algorithms through the above formula (2) in a case where a correspondence between coordinates (u, v) of various marking points in the camera coordinate system on the left side of the given equal sign and coordinates (x, y, z) of various marking points in the world coordinate system on the right side of the given equal sign, for example, in a case where the correspondence is determined using the method shown in FIGS. 3A-3C. Specifically, algorithms for determining the two matrices comprise, but not limited to, a Random Sample Consensus (RANSAC) algorithm, a Direct Linear Transformation (DLT) algorithm, a PosIt algorithm, etc. Here, some of these algorithms are applicable to coplanar marking points, while others may only be applied to non-coplanar marking points. When an algorithm which is only applicable to non-coplanar marking points is used, it needs to arrange the plurality of marking points 105 on the object 100 to be positioned in a non-coplanar manner. In addition, various algorithms for calculating the rotation matrix R and the translation matrix T may be understood by those skilled in the art, and thus will not be described in detail here in the present disclosure.

Further, for each row of elements of the rotation matrix R and the translation matrix T, it is equivalent to solving a quaternion equation set in a case where a plurality of $p_w=[x\ y\ z]^T$ and a plurality of corresponding $p_c=[u\ v]^T$ are determined using the method shown in FIG. 3, for example. In other words, the coordinates $p_w=[x\ y\ z]^T$ of at least four marking points in the world coordinate system, the coordinates $p_c=[u\ v]^T$ of the marking point images in the camera coordinate system, and the correspondence therebetween are required to determine, for example, $[r_{11}\ r_{12}\ r_{13}\ t_1]$, $[r_{21}\ r_{22}\ r_{23}\ t_2]$ and $[r_{31}\ r_{32}\ r_{33}\ t_3]$. However, as described above, considering that in a case of some gestures of a user, not all the marking points 105 may be observed by the camera 110, and there may further be conditions such as image noises, data errors caused by ambient light with excessive intensity, noises, etc., more than four marking points may be provided for subsequent positioning operations to improve the robustness of the system.

Thus, the position and/or posture of the object to be positioned (for example, the VR helmet 100, or more specifically, the plurality of marking points 105) relative to the camera 110 may be determined by solving the rotation matrix R (for example, for the posture) and translation matrix T (for example, for the position) described above. Thus, various subsequent other operations, such as target tracking, VR/AR display corresponding to an operation of the user 120 etc., may be implemented accordingly.

Hereinafter, a method for spatial positioning according to an embodiment of the present disclosure will be described in detail in conjunction with FIG. 5.

Figure 5:
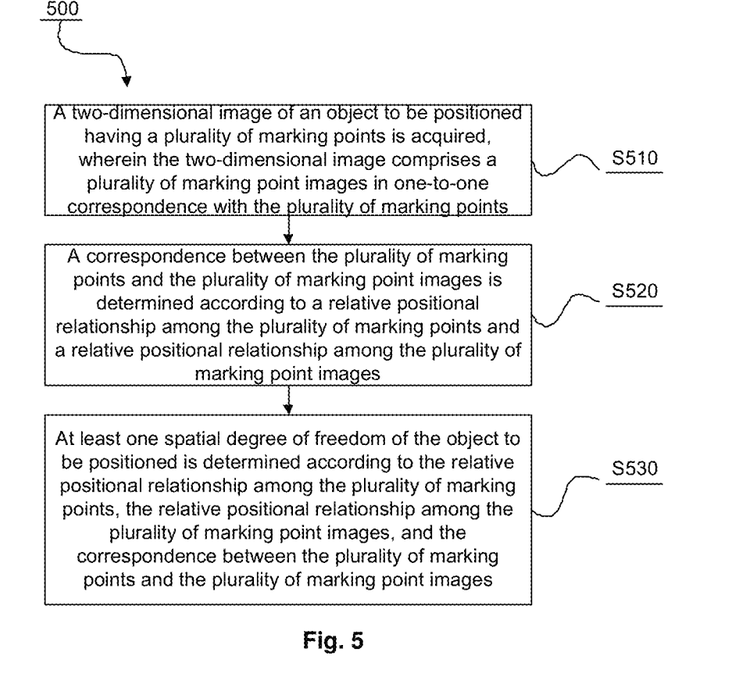
FIG. 5 is an exemplary flowchart illustrating a spatial positioning method according to an embodiment of the present disclosure.

FIG. 5 is an exemplary flowchart illustrating a spatial positioning method 500 according to an embodiment of the present disclosure. As shown in FIG. 5, the method 500 may comprise steps S510, S520 and S530. According to the present disclosure, some of the steps of the method 500 may be performed separately or in combination, may be performed in parallel or sequentially, and are not limited to a specific order of operations shown in FIG. 5. In some embodiments, the method 500 may be performed by the camera 110 or the VR helmet 100 shown in FIG. 1 or another electronic device.

Figure 6:
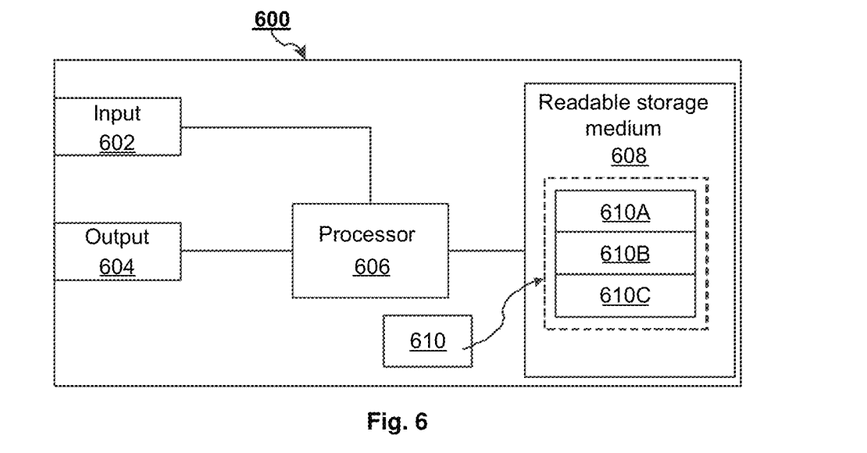
FIG. 6 is a hardware arrangement diagram illustrating a spatial positioning device according to an embodiment of the present disclosure.

The method 500 may start at step S510, in which a two-dimensional image of an object to be positioned having a plurality of marking points may be acquired by, for example, a processor 606 of a device 600 shown in FIG. 6, wherein the two-dimensional image comprises a plurality of marking point images in one-to-one correspondence with the plurality of marking points.

In step S520, a correspondence between the plurality of marking points and the plurality of marking point images may be determined by, for example, the processor 606 of the device 600 shown in FIG. 6 according to a relative positional relationship among the plurality of marking points and a relative positional relationship among the plurality of marking point images.

In step S530, at least one spatial degree of freedom of the object to be positioned may be determined by, for example, the processor 606 of the device 600 shown in FIG. 6 according to the relative positional relationship among the plurality of marking points, the relative positional relationship among the plurality of marking point images, and the correspondence between the plurality of marking points and the plurality of marking point images.

In some embodiments, step S520 may comprise determining a first marking point image of the plurality of marking point images which corresponds to a first marking point according to marking features of the plurality of marking point images, wherein the first marking point has a specific marking feature; and determining a correspondence between marking points other than the first marking point and remaining marking point images in the two-dimensional image based on the relative positional relationship among the plurality of marking points, the relative positional relationship among the plurality of marking point images, and the determined first marking point image. In some embodiments, determining a first marking point image of the plurality of marking point images which corresponds to a first marking point according to marking features of the plurality of marking point images may comprise: determining one of the plurality of marking point images which has a marking feature matching the specific marking feature as the first marking point image. In some embodiments, the specific marking feature is associated with at least one of an area, a shape, a texture, or a color. In some embodiments, determining a correspondence between marking points other than the first marking point and remaining marking point images in the two-dimensional image based on the relative positional relationship among the plurality of marking points, the relative positional relationship among the plurality of marking point images, and the determined first marking point image may comprise: identifying a characteristic axis of an elliptical shape of the first marking point image, wherein the characteristic axis is a major axis or minor axis of the elliptical shape; determining respective vertical distances from the plurality of marking point images to the characteristic axis of the elliptical shape; dividing the plurality of marking point images into groups of marking point images according to the determined vertical distances; and determining a correspondence between different marking point images in each group of marking point images and corresponding marking points. In some embodiments, dividing the plurality of marking point images into groups of marking point images may comprise: dividing marking point images having the same vertical distance and located on the same side of the characteristic axis of the elliptical shape into one group of marking point images. In some embodiments, determining one of the plurality of marking point images which has a marking feature matching the specific marking feature as the first marking point image may comprise: performing binarization processing on the two-dimensional image; determining one or more connected regions in the binarized two-dimensional image; and determining a connected region which satisfies at least one of the following conditions as the first marking point image: the connected region has a largest area or the connected region has an elliptical shape. In some embodiments, the method 500 may further comprise: performing elliptical fitting on the one or more connected regions to determine a central point of each of the connected regions as a position of a corresponding marking point image. In some embodiments, the plurality of marking points may be at least four marking points. In some embodiments, the plurality of marking points may be eleven marking points. In some embodiments, four groups of marking points may be mirror symmetrically distributed with a characteristic axis (for example, a major axis) of the largest elliptical first marking point as a symmetry axis, wherein numbers of marking points in various groups of marking points may be 3, 2, 2 and 3, respectively, and a direction in which marking points in each group are arranged may be parallel to the characteristic axis. In some embodiments, each of the marking points may be determined by using at least one of a visible light source, an infrared light source, or a non-light source marking point.

FIG. 6 is a block diagram illustrating an exemplary hardware arrangement 600 of a spatial positioning device according to an embodiment of the present disclosure. The spatial positioning device may be implemented on the camera 110 or the VR helmet 100 shown in FIG. 1 or another electronic device. The hardware arrangement 600 comprises a processor 606 (for example, a Digital Signal Processor (DSP), a Central Processing Unit (CPU), etc.) The processor 606 may be a single processing unit or a plurality of processing units configured to perform different acts of the flows described herein. The arrangement 600 may further comprise an input unit 602 configured to receive signals from other entities, and an output unit 604 configured to provide signals to other entities. The input unit 602 and the output unit 604 may be arranged as a single entity or as separate entities.

In addition, the arrangement 600 may comprise at least one readable storage medium 608 in a form of non-volatile or volatile memory, such as an Electrically Erasable Programmable Read Only Memory (EEPROM), a flash memory, and/or a hard disk driver. The readable storage medium 608 comprises a computer program 610 which comprises codes/computer readable instructions that, when executed by the processor 606 in the arrangement 600, cause the hardware arrangement 600 and/or a device including the hardware arrangement 600 to perform the flows described above in conjunction with FIGS. 1-5 and any variations thereof.

The computer program 610 may be configured as computer program codes having architecture of computer program modules 610A-610C, for example. Thus, in an exemplary embodiment when the hardware arrangement 600 is used in, for example, the VR helmet 100, the camera 110, or another electronic device, the codes in the computer program of the arrangement 600 may comprise a module 610A configured to acquire a two-dimensional image of an object to be positioned having a plurality of marking points, wherein the two-dimensional image comprises a plurality of marking point images in one-to-one correspondence with the plurality of marking points; a module 610B configured to determine a correspondence between the plurality of marking points and the plurality of marking point images according to a relative positional relationship among the plurality of marking points and a relative positional relationship among the plurality of marking point images; and a module 610C configured to determine at least one spatial degree of freedom of the object to be positioned according to the relative positional relationship among the plurality of marking points, the relative positional relationship among the plurality of marking point images, and the correspondence between the plurality of marking points and the plurality of marking point images.

The computer program modules may substantially perform various actions in the flows illustrated in FIGS. 1-5 to simulate the VR helmet 100, the camera 110, or the other electronic device. In other words, when different computer program modules are executed in the processor 606, they may correspond to different units or modules in the VR helmet 100, the camera 110, or the other electronic device.

Although the code means in the embodiment disclosed above in conjunction with FIG. 6 is implemented as computer program modules that, when executed in the processor 606, cause the hardware arrangement 600 to perform the actions described above in conjunction with FIGS. 1-5, in an alternate embodiment, at least one of the code means may be implemented at least partially as a hardware circuit.

The processor may be a single CPU, or may also comprise two or more processing units. For example, the processor may comprise a general purpose microprocessor, an instruction set processor, and/or a related chipset and/or a special purpose microprocessor (for example, an Application-Specific Integrated Circuit (ASIC).) The processor may also comprise an onboard memory for caching purposes. The computer program may be carried by a computer program product connected to the processor. The computer program product may comprise a computer readable medium having a computer program stored thereon. For example, the computer program product may be a flash memory, a Random Access Memory (RAM), a ROM, or an EEPROM, and in an alternative embodiment, the computer program modules described above may be distributed to different computer program products in a form of memory within the UE.

The present disclosure has been hereto described in connection with the preferred embodiments. It should be understood that various other changes, substitutions and additions may be made by those skilled in the art without departing from the spirit and scope of the present disclosure. Therefore, the scope of the present disclosure is not limited to the specific embodiments described above, but should be defined by the appended claims.

We claim:

1. A method of positioning an object, the method comprising steps of:
    acquiring a two-dimensional image of an object to be positioned having a plurality of marking points, the two-dimensional image comprising a plurality of marking point images in one-to-one correspondence with the plurality of marking points;
    determining a correspondence between the plurality of marking points and the plurality of marking point images according to a relative positional relationship among the plurality of marking points and a relative positional relationship among the plurality of marking point images; and
    determining at least one of position and posture of the object to be positioned according to the relative positional relationship among the plurality of marking points, the relative positional relationship among the plurality of marking point images, and the correspondence between the plurality of marking points and the plurality of marking point images,
    wherein the step of determining a correspondence between the plurality of marking points and the plurality of marking point images according to a relative positional relationship among the plurality of marking points and a relative positional relationship among the plurality of marking point images comprises:
        determining a first marking point image of the plurality of marking point images which corresponds to a first marking point according to marking features of the plurality of marking point images, wherein the first marking point has a specific marking feature; and
        determining a correspondence between marking points other than the first marking point and remaining marking point images in the two-dimensional image based on the relative positional relationship among the plurality of marking points, the relative positional relationship among the plurality of marking point images, and the determined first marking point image,
    wherein the step of determining a first marking point image of the plurality of marking point images which corresponds to a first marking point according to marking features of the plurality of marking point images comprises:
        determining one marking point image of the plurality of marking point images which has a marking feature matching the specific marking feature as the first marking point image,
    wherein the specific marking feature is an elliptical shape, and the step of determining a correspondence between marking points other than the first marking point and remaining marking point images in the two-dimensional image based on the relative positional relationship among the plurality of marking points, the relative positional relationship among the plurality of marking point images, and the determined first marking point image comprises:
        identifying a characteristic axis of the elliptical shape of the first marking point image, wherein the characteristic axis is a major axis or minor axis of the elliptical shape;
        determining respective vertical distances from the plurality of marking point images to the characteristic axis of the elliptical shape;
        dividing the plurality of marking point images into groups of marking point images according to the determined vertical distances; and
        determining a correspondence between different marking point images in each group of marking point images and corresponding marking points;
    wherein the specific marking feature is associated with at least one of an area, a shape, a texture, or a color.

2. The method according to claim 1, wherein the step of dividing the plurality of marking point images into groups of marking point images comprises:
    dividing marking point images having the same vertical distance and located on a same side of the characteristic axis of the elliptical shape into one group of marking point images.

3. The method according to claim 1, wherein the step of determining one of the plurality of marking point images which has a marking feature matching the specific marking feature as the first marking point image comprises:
    performing binarization processing on the two-dimensional image;
    determining one or more connected regions in the binarized two-dimensional image; and
    determining one of the connected regions which satisfies at least one of the following conditions as the first marking point image: the connected region has a largest area or the connected region has an elliptical shape.

4. The method according to claim 3, further comprising:
    performing elliptical fitting on the one or more connected regions to determine a central point of each of the connected regions as a position of a corresponding marking point image.

5. The method according to claim 1, wherein the plurality of marking points comprise at least four marking points.

6. The method according to claim 5, wherein the plurality of marking points comprise eleven marking points.

7. The method according to claim 6, wherein four groups of marking points are mirror symmetrically distributed with a characteristic axis of the largest elliptical first marking point as a symmetry axis, wherein numbers of marking points in the four groups of marking points are 3, 2, 2 and 3, respectively, and a direction in which marking points in each group are arranged is parallel to the characteristic axis.

8. The method according to claim 1, wherein each of the marking points is determined by using at least one of a visible light source, an infrared light source, and a non-light source marking point.

9. A device for positioning an object, the device comprising:
    a processor; and
    a memory having instructions stored thereon, wherein the instructions when executed by the processor cause the processor to perform the method according to claim 1.

10. A device for positioning an object, the device comprising:
    a processor; and
    a memory having instructions stored thereon, wherein the instructions when executed by the processor cause the processor to perform the method according to claim 3.

11. An apparatus for positioning an object, the apparatus comprising:
    the device according to claim 9; and
    a camera configured to capture a two-dimensional image of an object to be positioned and transmit the two-dimensional image to the spatial positioning device.

12. An apparatus for positioning an object, the apparatus comprising:
the device according to claim 10; and
a camera configured to capture a two-dimensional image of an object to be positioned and transmit the two-dimensional image to the spatial positioning device.

13. A non-transitory computer readable storage medium having instructions stored thereon, wherein the instructions when executed by a processor cause the processor to perform the method according to claim 1.

* * * * *